United States Patent [19]

Kirst et al.

[11] 4,338,954
[45] Jul. 13, 1982

[54] COMBINE CYLINDER REEL TOOTH

[75] Inventors: Robert J. Kirst; Frederick H. Oppenhuisen, both of Buchanan, Mich.

[73] Assignee: National-Standard Company, Niles, Mich.

[21] Appl. No.: 233,662

[22] Filed: Feb. 11, 1981

Related U.S. Application Data

[63] Continuation of Ser. No. 73,683, Sep. 10, 1979, abandoned, which is a continuation of Ser. No. 827,555, Aug. 25, 1977, abandoned.

[51] Int. Cl.³ .............................................. A01F 12/22
[52] U.S. Cl. ................................................. 130/27 G
[58] Field of Search ................ 130/27 G, 27 H, 27 P

[56] References Cited

U.S. PATENT DOCUMENTS

| 168,305 | 9/1875 | Waterman | 130/27 G |
|---|---|---|---|
| 308,136 | 11/1884 | Christian | 130/27 G |
| 753,921 | 3/1904 | Sanderson | 130/27 G |
| 786,019 | 3/1905 | Flesher | 130/27 G |
| 918,857 | 4/1909 | Jacobson et al. | 130/27 G |

FOREIGN PATENT DOCUMENTS

| 560114 | 6/1923 | France | 130/27 G |
|---|---|---|---|
| 513123 | 2/1955 | Italy | 130/27 G |

Primary Examiner—J. N. Eskovitz
Attorney, Agent, or Firm—Emrich, Lee, Brown & Hill

[57] ABSTRACT

A cold forged cylinder reel tooth adapted to be mounted to the cylinder of a threshing mechanism includes a threshing portion, a tapered seating portion and a fastening portion. The threshing portion includes identical symmetrical double-edged surface blades which are reversable to provide that the opposite unworn edged blade is positioned to engage the grain when the first edge blade is worn beyond practical use. The tapered seating portion permits proper indexing of the reel tooth 180 degrees to permit the unworn opposite double edge surface to engage the incoming grain in the threshing mechanism and the fastening portion provides rapid mounting and demounting of the cylinder reel tooth from the cylinder during the indexing operation.

4 Claims, 5 Drawing Figures

COMBINE CYLINDER REEL TOOTH

This is a continuation of application Ser. No. 073,683, filed Sept. 10, 1979, now abandoned, which in turn was a continuation of application No. 827,555, filed Aug. 25, 1977, now abandoned.

BACKGROUND OF THE INVENTION

The threshing mechanism of a harvesting machine includes a rotating cylinder mounted therein which cooperates with a concave unit to thresh the grain as the grain is fed into the threshing mechanism from a headerassembly on the harvesting machine. The threshing cylinder rotates and engages the incoming cut grain such that the majority of the grain is removed and dropped through an open grate in the concave unit where the grain is collected and transported by some type of auger flighting to a storage area.

In the past, cylinder reel teeth have been manufactured generally by hot forging a steel plate and cold trimming the plate to the desired shape to provide a cylinder reel tooth. The resultant hot forging and subsequent cold trimming of the steel plate produces ragged edges on the parting line of the trimmed steel plate or blade which damages the grain during the threshing mechanism and provides a cylinder reel tooth having undesirable tensile and yield strength. Because such prior art cylinder reel teeth or blades include only one blade surface to contact the grain passing through the threshing mechanism, the ragged edges on the parting line of the blade results in rapid wear of the blade surface of the cylinder reel tooth. See U.S. Pat. Nos. 3,664,100 and 3,410,271 for examples of the structure of the single edged reel teeth or blades. This rapid wear of cylinder reel tooth results in increased maintenance cost in maintaining the threshing mechanism in efficient operating condition and requires considerable down time of the threshing mechanism as individual reel teeth are replaced. The resultant expensive replacement of reel teeth and a considerable amount of down time of the threshing mechanism may result in the loss of a particular crop to be harvested and has resulted in inefficiency of the particular threshing machines in harvesting the grain.

SUMMARY OF THE INVENTION

It is one object of the present invention to provide a symmetrical, cold-forged reel tooth having a plurality of threshing surfaces thereon for use in a harvesting mechanism.

It is a further object of the present invention to provide symmetrical shaped reel teeth which may be indexed 180 degrees to provide increased wearability.

It is still another object of the present invention to provide a cold-forged symmetrical reel tooth having a precision tapered seating portion to provide firm seating of the reel tooth to a cylinder member or holding bars.

A further object of the present invention is to provide a cold-forged cylinder reel tooth having cold formed threads thereon to provide a reel tooth possessing increased tensile and yield strength.

A still further object of the present invention is to provide a method of processing steel bar stock to provide a cold-forged cylinder reel tooth.

The cold forged combine cylinder reel tooth of the present invention is produced by cold forming steel bar stock into an elongated conical shaped plug having a tapered square portion intermediate the ends thereof. The tapered square portion is then treated by cold upsetting, as is well known in the art, to provide a uniform and precision shaped tapered square seating portion which accurately seats in the cylinder mechanism or hold bar portion thereof. One end portion of the cold formed symmetrical conical shaped plug is then cold extruded to a pitch diameter to produce a mounting stem portion having a diameter slightly greater than the subsequent threads which are threaded thereon. The opposite grain contacting end portion of the cold formed symmetrical conical shaped plug is then flattened in a press to provide a reel tooth operating portion which is symmetrical and having double cutting edges or blades thereon which permits the operator of threshing mechanism to reverse the cutting edge or blade of the reel tooth when the reel tooth becomes worn with usage and to rotate the blade 180 degrees and index the same into the cylinder mechanism or holding bar portion for further usage in the threshing mechanism.

When the reel tooth portion has been flattened, the mounting end stem portion is cold rolled threaded to provide threads having greater tensile strength and yield strength than a conventional cold forged reel tooth. After the mounting end stem portion has been cold rolled threaded, the flattened or reel tooth operating portion is heat treated to provide a reel tooth which is symmetrical and having a uniformly identically shaped cutting edge or blade on the opposite sides thereof.

The reel tooth of the present invention is symmetrical and therefor reversable and allows the operator of the threshing mechanism to remove the reel tooth from the cylinder mechanism or holding bar portion and to index the tooth 180 degrees and reinstall it for additional usage. Additionally, the flattening and subsequent heat treating processes provide a cold formed reel tooth portion having a smooth even radius on the leading and working edges or blades of the tooth, thus eliminating the ragged edges on the parting line left after hot forging and trimming of conventional reel teeth. Moreover, the uniformly shaped tapered square seating portion permits the reel tooth to seat more accurately and firmly in the cylinder mechanism or holding bar portion thereby facilitating the removal, indexing and mounting of the reel tooth in the threshing mechanism.

DETAILED DESCRIPTION OF THE INVENTION

Figure 1:
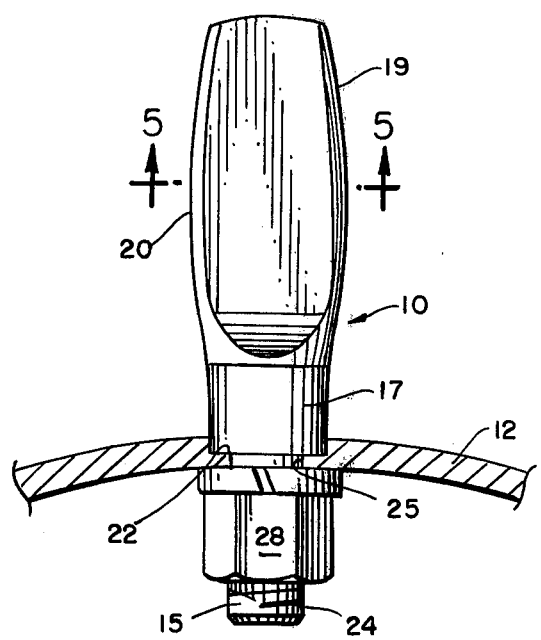
FIG. 1 is a cross-sectional view showing the installation of a cold-forged reel tooth in accordance with the present invention onto a threshing mechanism.

Referring now to the drawings, wherein like reference numerals have been used throughout the several views to identify the same or similar parts, in FIG. 1 there is shown a cold-forged combine cylinder reel tooth 10 mounted to a combine cylinder member or means 12 which is adapted to receive and fixedly mount the reel tooth 10, as will hereinafter be described.

Figure 4:
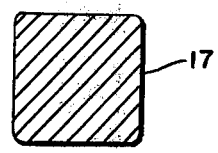
FIG. 4 is a view taken along lines 4—4 of FIG. 2 showing the tapered square seating portion of the reel tooth in accordance with the present invention.

The cold-forged combine cylinder reel tooth 10 is produced by cold forming steel bar stock (not shown) into an elongated conical shaped plug 13 having a tapered square portion 14 located intermediate an end stem portion 15 and the opposite grain contacting end portion 16 thereof. The tapered square portion 14 is then treated by cold upsetting, a treatment well known in the art, to provide a uniform and precision shaped tapered square seating portion 17 (FIG. 4) which accurately seats in the combine cylinder means 12, as shown in FIG. 1.

Figure 2:
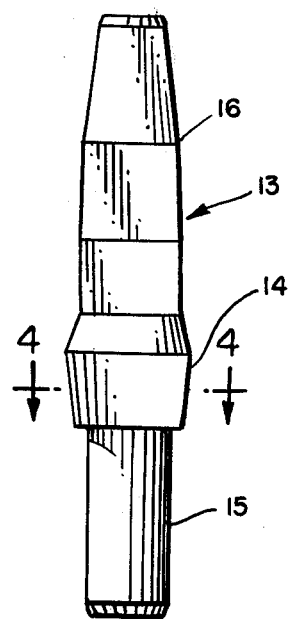
FIG. 2, a side-elevational view showing the tapered square seating portion, the cold extruded mounting stem portion plug, and the cold forged conical shaped reel tooth portion in accordance with the present invention.

The end stem portion 15 of the elongated conical shaped plug 13 is then cold extruded to a pitch diameter to produce a mounting plug or stem having a diameter slightly greater than threads which are subsequently threaded thereon, as shown in FIG. 2. The opposite grain contacting end portion of the elongated conical shaped plug 13 is then flattened in a press (not shown) to provide a reel tooth portion 19 which is symmetrical and includes double cutting edges or blades faces 18 thereon. The cutting blades 18 permit the operator of the threshing mechanism to reverse the reel tooth and cutting blade 18 thereon when the working cutting blade becomes worn, as will hereinafter be described.

Figure 3:
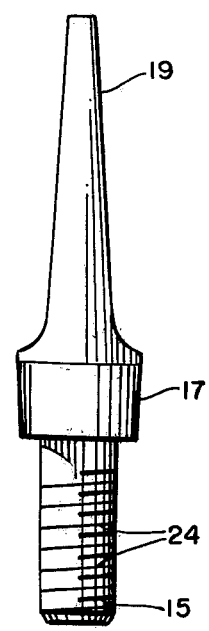
FIG. 3 is a side-elevational view showing the flattened reel tooth portion and the cold rolled threaded end stem portion of the reel tooth in accordance with the present invention.
Figure 5:
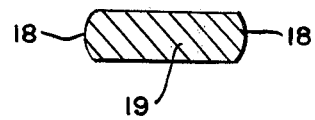
FIG. 5 is a cross-sectional view taken along lines 5—5 of FIG. 1 showing the symmetrical blade portion of the reel tooth in accordance with the present invention.

When the reel tooth portion has been flattened in a press, the threads 24 (FIG. 3) on the end stem portion 15 are cold rolled threaded thereon to provide threads having greater tensile strength and yield strength than conventional reel teeth. Thereafter, the flattened reel tooth grain contacting portion 19 is heat treated to provide a reel tooth having uniformly shaped cutting blade faces 18 (FIG. 5), and to provide symmetrical cutting edges 19 and 20 thereon (FIG. 1).

The combine cylinder member or means 12 is utilized to mount the cold forged cylinder reel tooth 10 in any conventional manner. The cylinder means may include cylinder bar (not shown) mounted thereon. Importantly, the combine cylinder means 12 includes a square recess 22 overlapping an opening 25, therein with the square recess 22 adapted to receive and hold the tapered square seating portion 17 of the cylinder reel tooth in operating position. Conventionally, fastening bolts or means 28 are engageable with the threads 24 on the end stem portion 15 to rigidly mount and hold the reel tooth 10 in operating position.

During a period of prolonged combine operation, it is common for the cutting blade face 18 to become worn thereby reducing the efficiency of the threshing mechanism. The present invention permits the operator thereof to sufficiently loosen the fastening means 28 to permit the tapered square seating portion of the reel tooth to be raised wherein it may be properly indexed 180 degrees to permit the exposure of the opposite and identically cutting blade face to the operating position.

What has been described is a cold-forged combine cylinder reel tooth having a plurality of cutting blade surfaces thereon which are symmetrical and therefor reversable to permit the operator of the threshing mechanism to remove the reel tooth from the cylinder mechanism or holding bar portion and to index the tooth 180 degrees and reinstall it for additional usage. Additionally, the method of treating bar stock including the flattening and subsequent heat treating processes to provide a cold-forged reel tooth portion having a smooth even radius on the leading and working edges or blades of the tooth, eliminate the ragged edges on the parting line left after hot forging and trimming of conventional reel teeth. Moreover, the uniformly tapered square seating portion permits the reel tooth of the present invention to seat more accurately and firmly in the cylinder mechanism or holding bar portion thereby facilitating the removal, indexing and mounting of the reel tooth in the threshing mechanism, results that are unobtainable with existing reel teeth.

We claim:

1. A cold-forged reel tooth mountable in a rotatable member of a threshing mechanism, said tooth being an elongated member comprising an elongated grain-contacting portion at one end, a stem portion at its other end and insertable into a recess in the rotatable member for fixedly mounting the tooth in the rotatable member, and a tapered seating portion intermediate the grain-contacting portion and the stem portion, the seating portion being adapted to be received in said recess, said grain-contacting portion being in the form of a blade having a thickness which decreases in the direction away from the seating portion of said blade and having planar surface sidewalls thereon and having a pair of oppositely facing edge surfaces each of which is convexly curved in two mutually perpendicular directions substantially to an arc of a parabola, one disposed in the elongated direction of the blade and the other transversely of the blade.

2. The reel tooth in accordance with claim 1 wherein said tapered seating portion is square shaped and each of the recesses in said supporting member is square shaped and adapted to receive the tapered seating portion of said reel tooth to permit indexing and mounting of said reel tooth to the supporting member.

3. The reel tooth in accordance with claim 1 wherein said stem portion includes threads thereon for fixedly mounting said reel tooth to the supporting member.

4. The reel tooth in accordance with claim 3 further including fastening means cooperating with said threaded stem portion to fixedly mount the reel tooth to the supporting member.

* * * * *